(12) United States Patent
Carmel et al.

(10) Patent No.: US 8,266,157 B2
(45) Date of Patent: Sep. 11, 2012

(54) METHOD AND SYSTEM FOR USING SOCIAL BOOKMARKS

(75) Inventors: David Carmel, Haifa (IL); Haggai Roitman, Haifa (IL); Elad Yom-Tov, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/550,376

(22) Filed: Aug. 30, 2009

(65) Prior Publication Data

US 2011/0219011 A1    Sep. 8, 2011

(51) Int. Cl.
G06F 17/30    (2006.01)
(52) U.S. Cl. ........................................... 707/749
(58) Field of Classification Search .................. 707/723, 707/748, 749
See application file for complete search history.

(56) References Cited

U.S. PATENT DOCUMENTS

| | | | |
|---|---|---|---|
| 2008/0177858 A1* | 7/2008 | Aarnio et al. | 709/217 |
| 2008/0183691 A1 | 7/2008 | Kwok et al. | |
| 2008/0282198 A1 | 11/2008 | Brooks et al. | |
| 2009/0006442 A1 | 1/2009 | Anderson et al. | |
| 2009/0077025 A1 | 3/2009 | Brooks et al. | |
| 2009/0083278 A1* | 3/2009 | Zhao et al. | 707/10 |
| 2009/0094189 A1 | 4/2009 | Stephens | |
| 2009/0144240 A1* | 6/2009 | Singh et al. | 707/3 |
| 2009/0144254 A1* | 6/2009 | O'Sullivan et al. | 707/5 |
| 2009/0171967 A1* | 7/2009 | Ceglowski | 707/10 |
| 2010/0088583 A1* | 4/2010 | Schachter | 715/206 |
| 2010/0114907 A1* | 5/2010 | Kirby | 707/748 |

OTHER PUBLICATIONS

Hybrid Content and Tag-Based Profiles for Recommendation in Collaborative Tagging Systems , Oct. 2008 http://ieeexplore.ieee.org/Xplore/login.jsp?url=http%3A%2F%2Fieeexplore.ieee.org%2Fiel5%2F4756146%2F4756147%2F04756162.pdf%3Farnumber%3D4756162&authDecision=-203.

* cited by examiner

Primary Examiner — Cam-Linh Nguyen

(57) ABSTRACT

A method and system for using social bookmarks wherein a social bookmark is a triplet of the entities of user, document, and tag. The method including: collecting multiple bookmarks; representing the bookmarks as a three-dimensional space or matrix of the number of times a user u, used tag t to bookmark document d; measuring the similarity of two entities of the same type; and using the similarity to weight bookmarks or entities. The weightings may be used to provide a measure of a usefulness of a bookmark for describing a document for retrieval purposes. Two-dimensions of the bookmark space may also be used to predict the third-dimension.

24 Claims, 6 Drawing Sheets

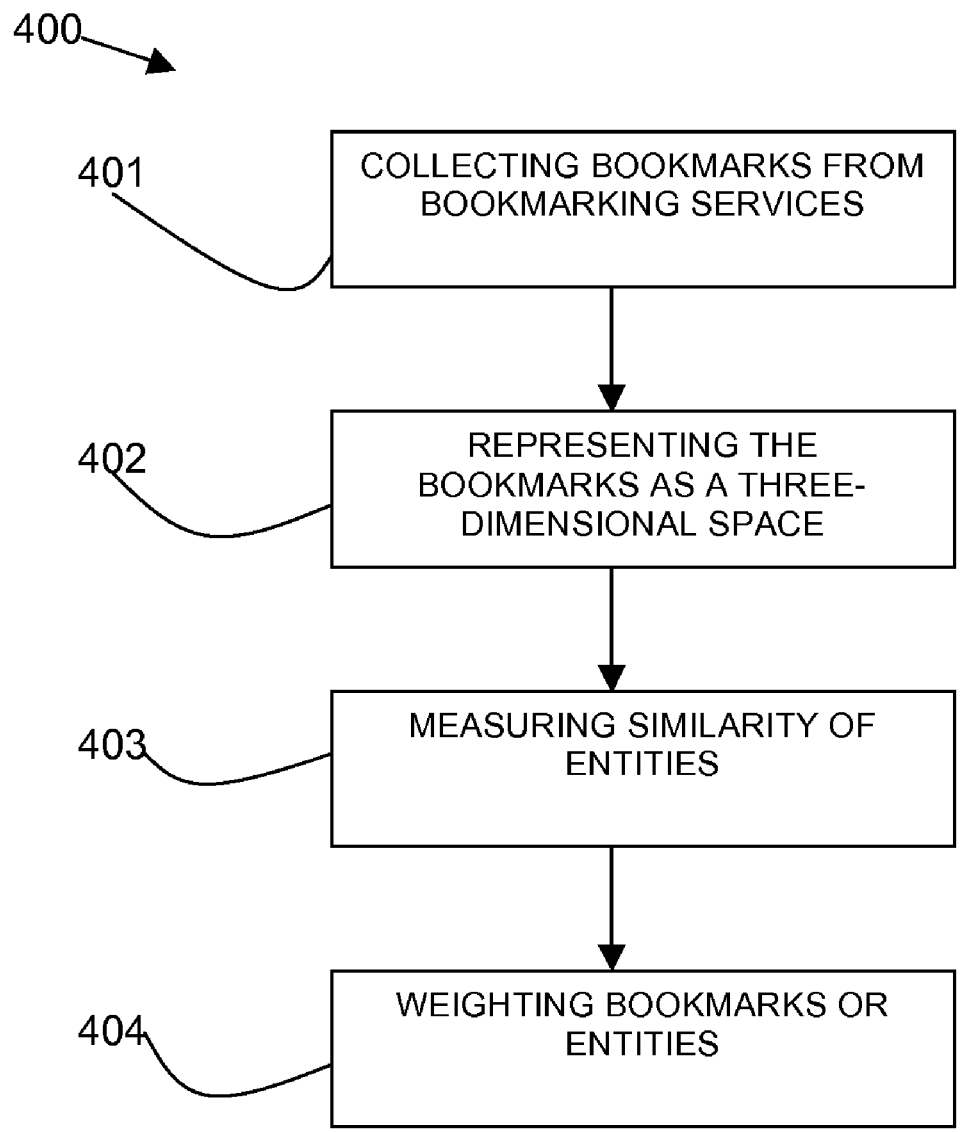

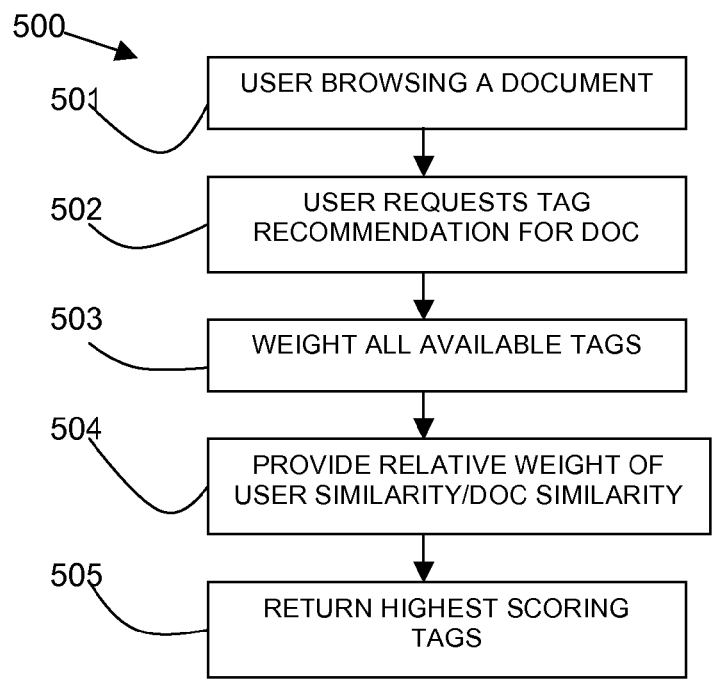
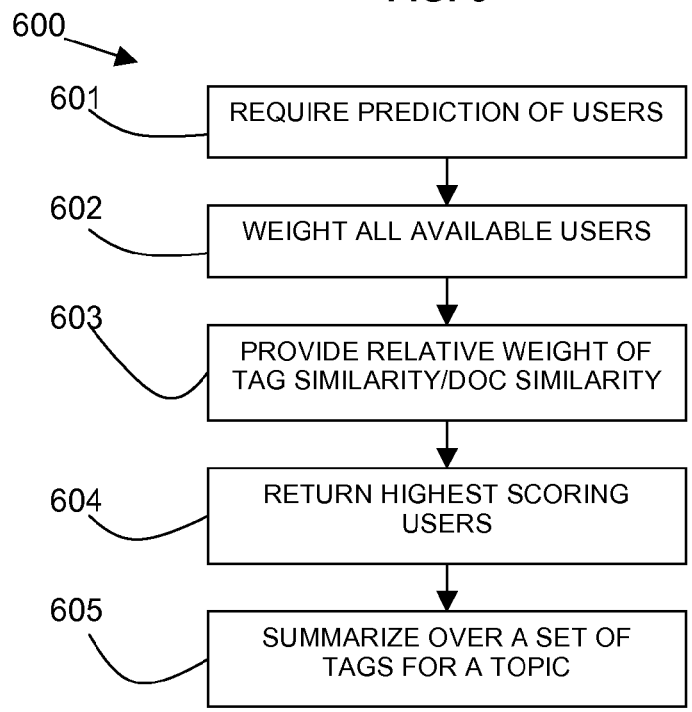

METHOD AND SYSTEM FOR USING SOCIAL BOOKMARKS

FIELD OF THE INVENTION

This invention relates to the field of social bookmarks. In particular, the invention relates to using social bookmarks for search enhancement and recommendation tasks.

BACKGROUND OF THE INVENTION

Social bookmarking takes an overwhelming role in the current Web 2.0 arena. It enables knowledge sharing and efficient discovery on the web, where different users can collaborate together by tagging documents of interest.

By allowing users the freedom to choose their own vocabulary to describe documents via annotations (tags), a social bookmarking system offers a highly flexible solution compared to traditional annotation systems which were restricted in their vocabulary usage. For these reasons, social bookmarking systems have become highly popular as means for users to organize and share their bookmarks with others.

Attention has been given to utilizing social bookmarking data to enhance traditional information retrieval (IR) tasks. For that purpose, traditional document-centric models have been extended to consider also new entity types such as the users of the system and the tags associated with the system's documents, in order to capture the different relationships between documents, users, and tags, which are embedded in bookmarks.

The social entities of a bookmarking system (i.e., documents, users, and tags) are commonly considered independently, where each entity is considered as a fundamental element of the system. Therefore, solutions to different tasks that utilize social information neglect the fact that each bookmark may imprint a unique entity on its own, which if considered, could contribute to improving those specific tasks.

As an illustrating example, the tag "bob" is considered that is associated with 155 different Web pages in an example bookmarking system. A simple analysis of these bookmarks reveals that many of the users who gave that tag are named "Bob" (or Robert) while only a few used that tag for the page titled "Blue Opportunity Bank (BoB)". While a user named "Bob" is welcome to tag any document with his name, it is easy to see that such bookmarks do not provide much benefit for IR tasks and might even mislead. Therefore, the set of bookmarks sharing the tag "bob" should be split into useful bookmarks (e.g., those associated with the "BoB" page) and private ones with much less benefit. The former are termed community tags (i.e., tags which can be used by the community) and the latter, private tags.

SUMMARY OF THE INVENTION

According to a first aspect of the present invention there is provided a method for using social bookmarks wherein a social bookmark is a triplet of the entities of user, document, and tag, the method comprising: collecting multiple bookmarks; representing the bookmarks as a three-dimensional space or matrix of the number of times a user u, used tag t to bookmark document d; measuring the similarity of two entities of the same type; and using the similarity to weight bookmarks; wherein any of said steps are implemented in either of computer hardware or computer software embodied in a computer-readable medium.

In one embodiment, the method may provide a measure of a usefulness of a bookmark for describing a document for retrieval purposes. The method may include: weighting a bookmark as a linear combination of: a weight for tag t for the (u,d) pair; a weight for user u for the (t,d) pair; and a weight for document d for the (t,u) pair.

The method may include adding a content of a tag to the document's content to be indexed wherein the tag and document are provided in a bookmark, and scoring the content of the tag by the measure of usefulness.

In another embodiment, the method may include using two-dimensions of the bookmark space to predict the third-dimension. The method may include: projecting the three-dimensional space onto a two-dimensional space by defining two-dimensional matrices for each of the pairs of (u,t), (d,t) and (d,u); normalizing the two-dimensional matrices to weight entities in inverse relation to their frequency; wherein entities can be represented by two viewpoints from the relationship with each of the other entities.

The method may include recommending tags to a given user for a given document, by weighting a tag as a combination of: scoring each tag by similarity of users providing the tag to the given user; and scoring each tag by similarity of document associated with the tag to the given document.

The method may include recommending users as most likely to provide a given document with a given tag, by weighting a user as a combination of: scoring each user by similarity of tags the user has provided to the given tag; and scoring each user by similarity of documents he has tagged to the given document. Recommending users for a (d,t) pair may be used to validate a bookmark as being useful when u, the recommended user, is highly scored for the (d,t) pair. Recommending users may be used for a user search to retrieve a community of users who have a common interest in a given tag or set of tags.

The method may include recommending documents to a given user, by weighting a document as a combination of: scoring each document by similarity of other users who tagged that document to the given user; and scoring each document by similarity to tags related to that document to the given tag; wherein documents are recommended to a user in relation to a given tag. The weighting of a document may be aggregated over all the given user's tags for a context-free recommendation.

According to a second aspect of the present invention there is provided a computer program product for using social bookmarks which a social bookmark is a triplet of the entities of user, document, and tag, the computer program product comprising: a computer readable medium; computer program instructions operative to: collect multiple bookmarks; represent the bookmarks as a three-dimensional space or matrix of the number of times a user u, used tag t to bookmark document d; measure the similarity of two entities of the same type; and use the similarity to weight bookmarks; wherein said program instructions are stored on said computer readable medium.

According to a third aspect of the present invention there is provided a system for using social bookmarks which a social bookmark is a triplet of the entities of user, document, and tag, comprising: a collector for collecting multiple bookmarks from one or more bookmarking servers; a storage medium for storing the bookmarks as a three-dimensional space or matrix of the number of times a user u, used tag t to bookmark document d; a measuring component for measuring the similarity of two entities of the same type; and a weighting component for weighting the bookmarks; wherein any of said collector, storage medium, measuring component, weighting component are implemented in either of computer hardware or computer software and embodied in a computer readable medium.

In one embodiment, the system may include a search enhancement component providing a measure of a usefulness of a bookmark for describing a document for retrieval purposes. The system may further include an indexing component for adding a content of a tag to the document's content to be indexed wherein the tag and document are provided in a bookmark.

In another embodiment, the system may include a recommendation component using two-dimensions of the bookmark space to predict the third-dimension.

The recommendation component may include: a projecting component for projecting the three-dimensional space onto a two-dimensional space by defining two-dimensional matrices for each of the pairs of (u,t), (d,t) and (d,u); a normalizing component for normalizing the two-dimensional matrices to weight entities in inverse relation to their frequency; wherein entities can be represented by two viewpoints from the relationship with each of the other entities.

The recommendation component may include recommending tags to a given user for a given document, by weighting a tag as a combination of: scoring each tag by similarity of users providing the tag to the given user; and scoring each tag by similarity of document associated with the tag to the given document.

The recommendation component may include recommending users as most likely to provide a given document with a given tag, by weighting a user as a combination of: scoring each user by similarity of tags the user has provided to the given tag; and scoring each user by similarity of documents he has tagged to the given document. Recommending users for a (d,t) pair may be used to validate a bookmark as being useful when u, the recommended user, is highly scored for the (d,t) pair. Recommending users may be used for a user search to retrieve a community of users who have a common interest in a given tag or set of tags.

The recommendation component may include recommending documents to a given user, by weighting a document as a combination of: scoring each document by similarity of other users who tagged that document to the given user; and scoring each document by similarity to other tags related to that document to the given tag; wherein documents are recommended to a user in relation to a given tag. The weighting of a document may be aggregated over all the given user's tags for a context-free recommendation.

A framework is proposed for social bookmarking that estimates the effectiveness of bookmarks as fundamental entities in social bookmarking systems. It is demonstrated that using this framework can enhance search effectiveness and further derive solutions to different recommendation tasks.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 4 is a flow diagram of a method in accordance with the present invention;

FIG. 5 is a flow diagram of a method of tag recommendation in accordance with an aspect of the present invention;

FIG. 6 is a flow diagram of a method of user recommendation in accordance with an aspect of the present invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The described method and system considers each bookmark, which consists of a specific (document, user, tag) triplet, as a complete indivisible entity in the system. Utilizing such an approach, allows a framework to be constructed in which the effectiveness of bookmarks as units of information can be estimated. One application of the described framework, utilizes the framework to estimate the usefulness of a bookmark for search effectiveness. Therefore, each bookmark is weighted by the framework according to its predicted effectiveness in describing the document it is associated with, given that it was annotated by a specific user with a specific tag.

Another application of the described framework is that by considering different combinations of the three entity types that consist of individual bookmarks, different applications that utilize social bookmarks data can be derived. Three additional tasks that are addressed using the proposed framework are as follows:

Tag recommendation: Given a document and the identity of the user who wishes to tag that document, recommend one or more tags to be used for annotating the document.

User recommendation: Given a pair of tag and document, estimate who are the most likely users that would give the tag to the document, for purposes such as finding a community of people who are interested in a specific topic.

Document recommendation: Given a pair of user and tag, estimate which are the most likely documents that would be given the tag by that user, for recommending new content to the user.

Figure 1:
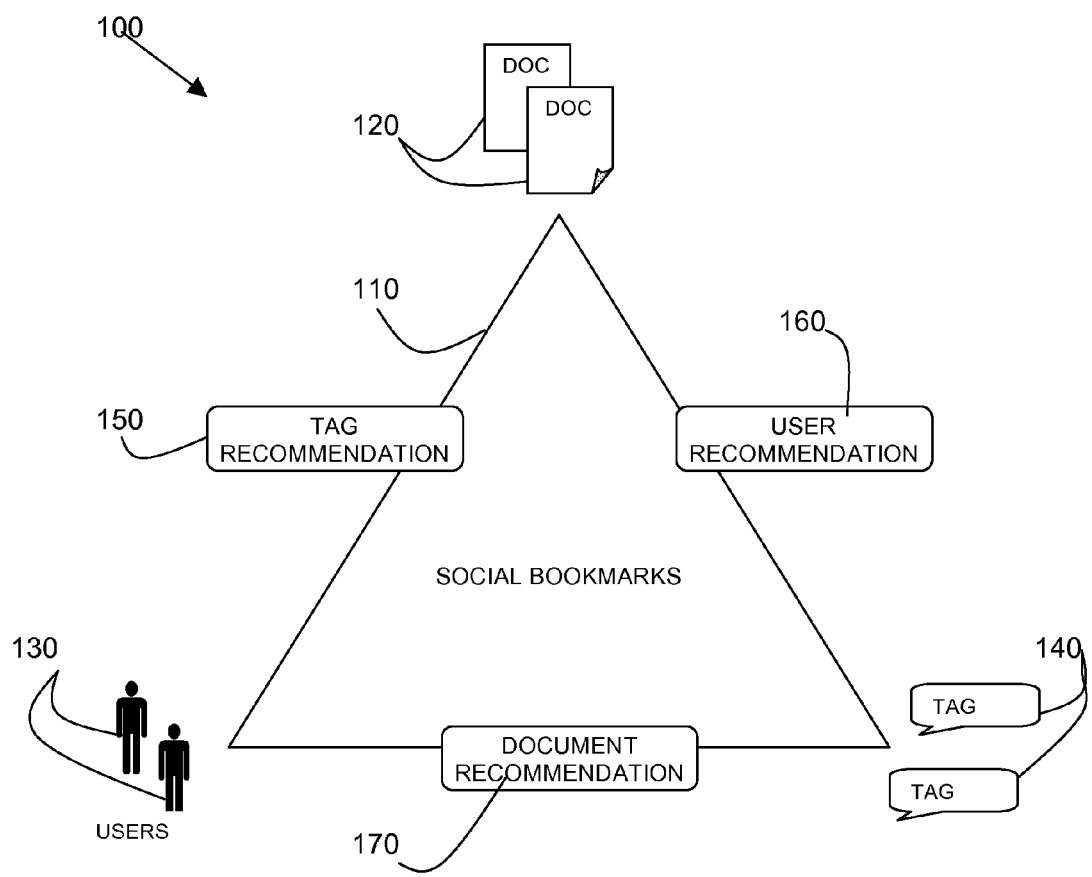
FIG. 1 is a schematic diagram of a bookmark.

Referring to FIG. 1 a schematic diagram shows the framework 100 of social bookmarks 110 as generated in Web services which include a tagging functionality. A social bookmark 110 links the three entities of users 130, documents 120, and tags 140. A user 130 who tags 140 a document 120 generates the triplet (user, document, tag) of a bookmark.

Data gathered relating to social bookmarks 110 can be used to derive recommendations for one of the entities based on the data gathered and analyzed for the other two entities in the triplet of the bookmark. A tag recommendation 150 can be based on documents 120 and users 130. A user recommendation 160 can be based on document 120 and tags 140. A document recommendation 170 can be based on users 130 and tags 140.

Figure 2:
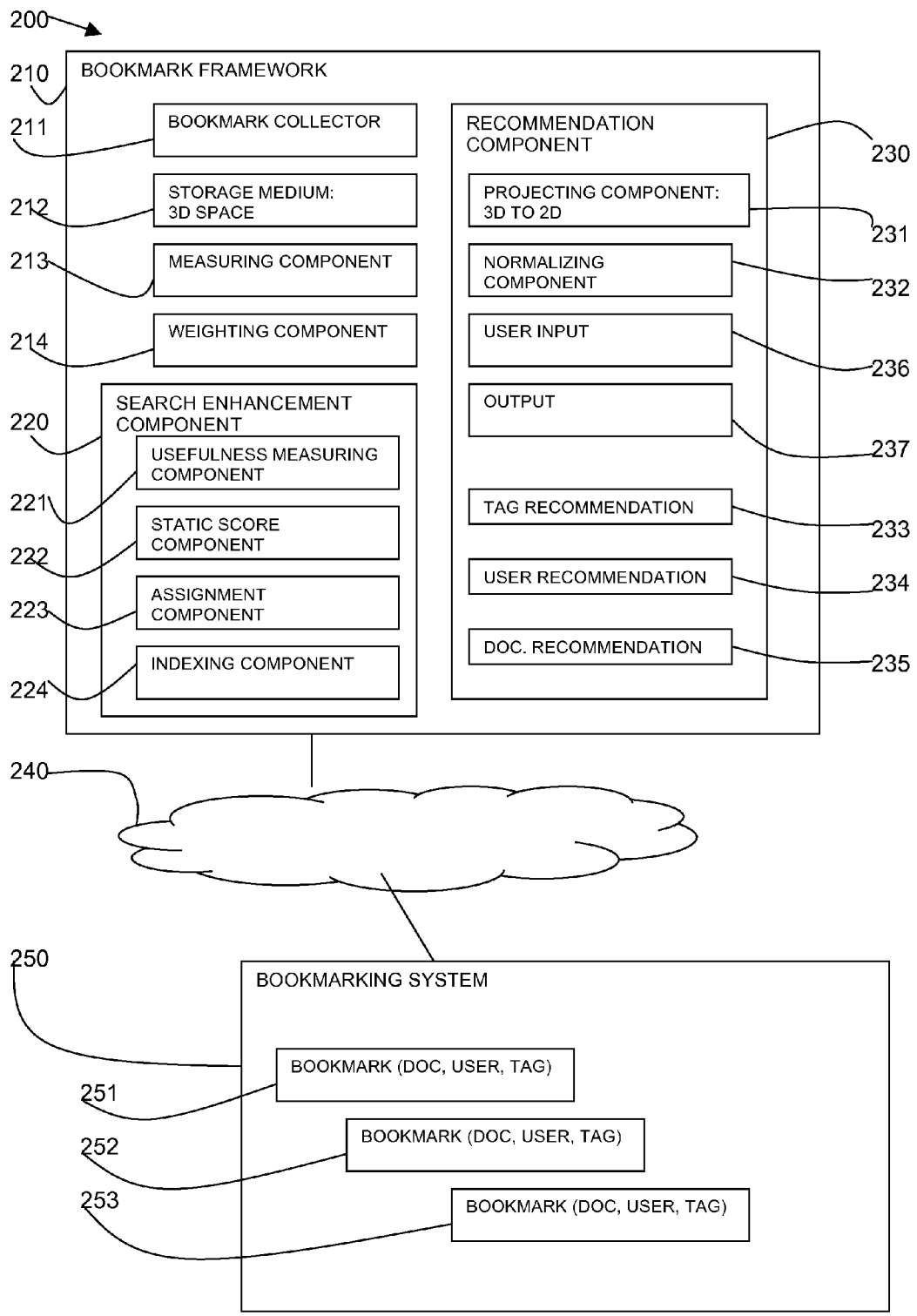
FIG. 2 is a block diagram of a system in accordance with the present invention.

Referring to FIG. 2, a block diagram shows a system 200 including a bookmark framework 210 for using social bookmarks for search enhancement and recommendation tasks. The bookmark framework 210 is in communication either directly or via a network 240 with an existing collaborative bookmarking system 250. The bookmarking system 250 has bookmark triplets (doc, user, tag) 251-253.

The bookmark framework 210 includes a bookmark collector 211 for collecting multiple bookmarks from one or more bookmarking system 250. The bookmark framework 210 also includes a storage medium 212 for storing the bookmarks as a three-dimensional space or matrix of the number of times a user used a tag to describe a document.

The bookmark framework 210 also includes a measuring component 213 for measuring the similarity of two entities of the same type and a weighting component 214 for weighting bookmarks or entities.

The bookmark framework 210 includes a search enhancement component 220 including a usefulness measuring component 221 of the usefulness of a bookmark for information retrieval of documents 260 during search. A static score component 222 generates a score for each bookmark and an assignment component 223 assigns the static score to the bookmark's tag to be used later for document retrieval.

The search enhancement component 220 includes an indexing component 224, which adds the tag of a bookmark to the document's content to be indexed.

The bookmark framework 210 includes a recommendation component 230 including a projecting component 231 for projecting the three-dimensional space 212 onto a two-dimensional space and a normalising component 232. The recommendation component 230 includes a tag recommendation component 233, a user recommendation component 234, and a document recommendation component 235. For the recommendation tasks, given a pair (u,t) of a user and tag, the document recommendation component 235 ranks the documents in the system by predicting a document's value to be tagged by user u with tag t. Similarly, for the other recommendation tasks.

The recommendation component 230 includes a user input 236 for inputting two entities in order to receive a recommendation in an output 237 of a third entity.

Figure 3:
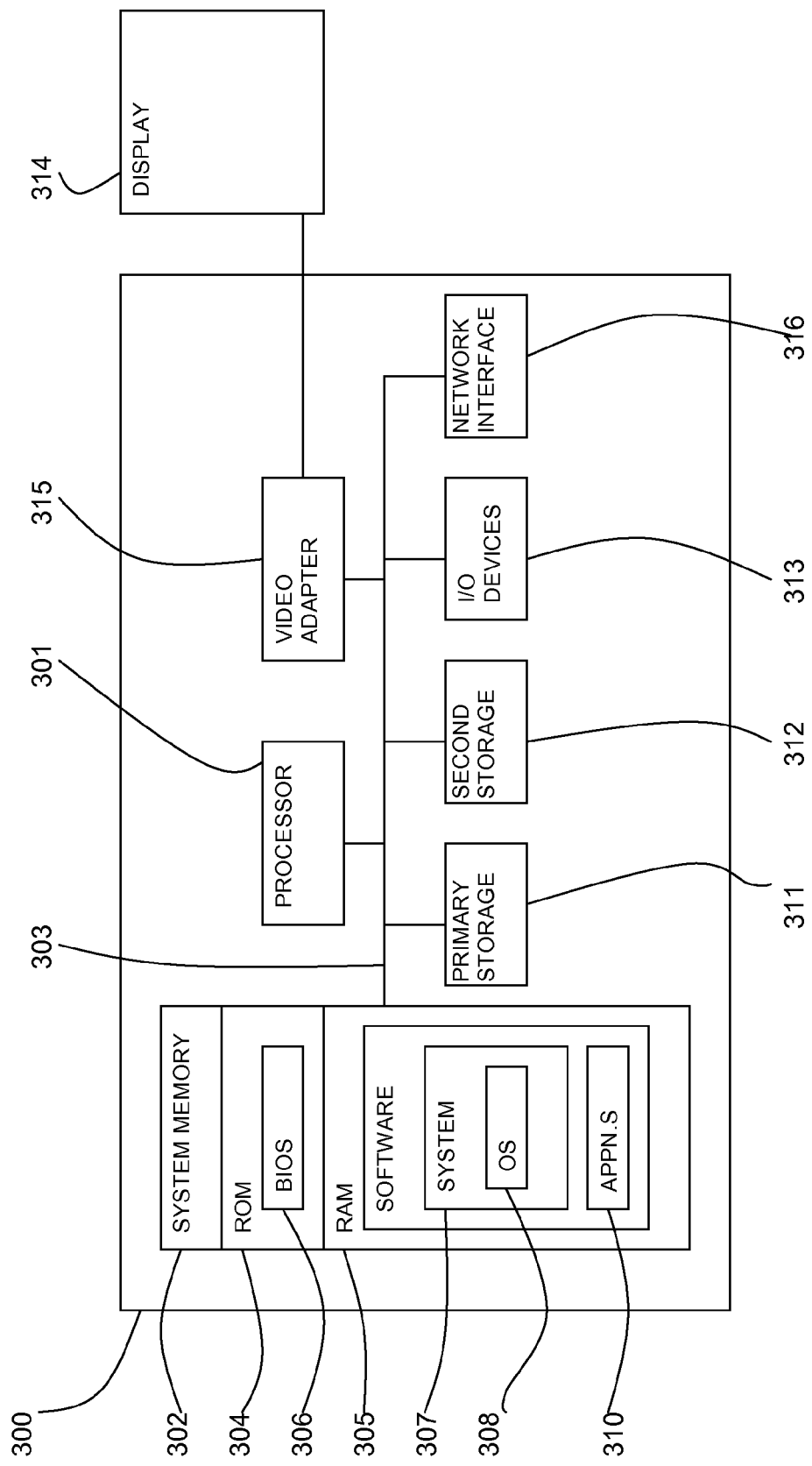
FIG. 3 is a block diagram of a computer system in which the present invention may be implemented.

Referring to FIG. 3, an exemplary system for implementing the bookmark framework includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

This section describes a general framework for social bookmarking that can provide a unified architecture for many IR applications. A bookmark is a triplet comprising of a specific document and a specific tag, given by a specific user. This triplet is denoted as: b=(d,u,t), where d is the document, u the user, and t the tag.

A collection of bookmarks B={b|b=(d, u, t)} can be viewed as a three dimensional space, or as a matrix whose entries are the number of times that a user u had used the tag t to describe the document d. Matrix entries may be non-negative values, however naturally, most (if not all) non-zero entries of this sparse matrix would be ones. The three-dimensional bookmark space offers additional applications for information retrieval compared to the traditional two-dimensional, term-document matrix. Three of these applications use two dimensions of the bookmark space to predict or infer the third dimension, while the other application makes use of all three dimensions to enhance search over bookmarked content.

Referring to FIG. 4, a flow diagram 400 includes the steps for generating a bookmark framework. Bookmarks are collected 401 from bookmarking services and represented 402 as a three-dimensional space of the number of times a user used a tag for a document. The similarity of two entities is measured 403 and used to weight bookmarks or entities 404.

Notations

Several matrices are defined which are used in the framework. These matrices are the projection of the bookmark space onto a two-dimensional space. Specifically, the three following matrices are defined:

$$M_{UT}(i,j)=|\{b=(d,u,t);u=u_i,t=t_j\}|$$

$$M_{DT}(i,j)=|\{b=(d,u,t);d=d_i,t=t_j\}|$$

$$M_{DU}(i,j)=|\{b=(d,u,t);d=d_i,u=u_j\}|$$

The matrix entries are normalized by a normalization scheme which weights entities in inverse relation to their frequency, similarly to the ief normalization method (see E. Amitay, D. Carmel, N. Golbandi, N. Har'El, S. Ofek-Koifman, and S. Yogev, "Finding people and documents, using web 2.0 data", In Workshop on Future Challenges in Expertise Retrieval, SIGIR 2008, pages 1-6, 2008.) Each matrix row that corresponds to a specific entity is multiplied by the inverse log of the sum of entries of the row.

$$M(i, j) = M(i, j) \cdot \log^{-1}\left(1 + \sum_k M(i, k)\right)$$

The transpose of a matrix is denoted by switching its dimensions. For example, $M_{TU}$, the tag-user relationship matrix, is the transpose of the matrix $M_{UT}$.

Entities can be represented in the bookmark space from two alternative viewpoints. Users, for example, can be represented by the tags they applied, i.e., user $u_i$ is represented by the ith row in the $M_{UT}$ matrix $\vec{u}_i^T = (u_{i1}, u_{i2}, \ldots, u_{i|T|})$ alternatively, by the documents they bookmarked, i.e., the ith row in the $M_{UD}$ matrix $\vec{u}_i^D = (u_{i1}, u_{i2}, \ldots, u_{i|D|})$ Similarly, documents are represented in the tag or the user space while tags are represented in the document or the user space.

The similarity is measured between two entities (of the same type) in the Y space by:

$$S_Y(x_i, x_j) = e^{-d(\vec{x}_i^Y, \vec{x}_j^Y)\beta}$$

where $d(\vec{x}_i^Y, \vec{x}_j^Y) = 1 - \cos(\vec{x}_i^Y, \vec{x}_j^Y)$ is the dissimilarity between the two entity vectors in the Y space, and $\beta \geq 0$ is a parameter that captures the frameworks similarity scaling factor, i.e., the smaller $\beta$ is, the larger the similarity between any two entities (for $\beta = 0$, all entities are considered identical while for $\beta \to \infty$ any entity is only similar to itself).

For a given $x \in X$ denote $\vec{S}_{X|Y}(x)$ the similarity of x with all other $x' \in X$ in the Y space. Denote the entry of entity x in the vector $\vec{v}$ by $\vec{v}[x]$.

For example, $\vec{S}_{U|T}(u)$ is the vector of similarities between user u and all other users as measured in the tag space, and $\vec{S}_{U|T}(u)[u']$ is the similarity between u and u' in that space.

Tag Recommendation

Tag recommendation is the ability to suggest to a user who is browsing a specific document the most likely tags that he may want to use for bookmarking this document.

In terms of the bookmark triplet, given d and u, all tags t are weighted such that the tags with the highest weight are those most likely to be given by this user to this document. The tags are weighted by observing the tags given to similar documents as well as the tags given by similar users.

Therefore, the weight given to each tag (represented as a vector of weights) is computed as:

$$\vec{w}_T(u,d) = \alpha_T \vec{S}_{U|T}(u) M_{UT} + (1-\alpha_T) \vec{S}_{D|T}(d) M_{DT} \quad (1)$$

The left part of the equation scores each tag according to the (tag-space) similarity of the users providing it to the given user u. The right part of the equation scores a tag by the (tag-space) similarity of the documents associated with it to the given document d. The parameter $\alpha_T$ represents the relative weight that is given to user similarity over document similarity. As a result, high scored tags are those given by users similar to u to documents similar to d. The higher scored tags are then recommended to the user u for document d.

Referring to FIG. 5, a flow diagram 500 shows a method of tag recommendation. A user u is browsing 501 a document d. The user requests 502 a tag recommendation for the document d. All the tags in the available data are weighted 503 by observing tags given to similar documents to document d and tags given by similar users to user u. A relative weight is provided 504 of user similarity and document similarity. The highest scoring tags are returned 505 to the user u as a recommendation.

User Recommendation

Given a document d and a tag t, the aim is to predict which users are most likely to tag d with t. Users are weighted by observing similar documents as well as similar tags. Therefore, the weight given to each user (represented as a vector of weights) is computed as:

$$\vec{w}_U(t,d) = \alpha_U \vec{S}_{T|U}(t) M_{TU} + (1-\alpha_U) \vec{S}_{D|U}(d) M_{DU} \quad (2)$$

The left part of the equation scores a user according to the (user-space) similarity of the tags he is related to with respect to the given tag t. The right part of the equation scores a user by the (user-space) similarity of the documents he bookmarked to the given document d. The parameter $\alpha_U$ represents the relative weight that is given to tag similarity over document similarity.

Two potential applications for user recommendation are bookmark validation and people search. Bookmark validation is the ability to infer whether or not a tag given by a user to a specific document is likely to be useful to other users or not. Reasons why a tag might not be useful for other members of the community include spamming, errors in tagging, and the use of a tag for purposes that most other users would consider as having other meanings. An example of the later, is the tag "search" which is apparently applied by most users to documents describing search applications. However, one user in the community seems to give this tag to any document he found through the use of a search engine.

Thus, bookmark validation is the ability to distinguish tags that are only relevant to a specific user from those which are generally useful. The first type of tags are termed "private tags" and the latter "community tags". If the only user who bookmarked a specific document d with tag t is given a high weight by the user recommendation component, it can be inferred that this is an indication to a private tag. In contrast, when the user recommendation component gives high scores to several users for the (d, t) pair (that is, predicts that multiple people are likely to use this tag to bookmark this document), it implies that this is a community tag rather than a private tag.

User recommendation can also be used for implementing people search which retrieves a virtual community of people who have common interest in a specific topic. Given a tag (or a set of tags) that represents the topic, it can be summarized over all bookmarks containing those tags, aggregating user scores given by the recommendation equation, to identify a community of users that produce a lot of bookmarking activity related to that topic.

Referring to FIG. 6, a flow diagram 600 shows a method of user recommendation. Given a document d and tag t, a prediction of users is required 601. All the users in the available data are weighted 602 by observing users by similar tags the user is related to tag t and user by similarity of documents the user bookmarked to document d. A relative weight is provided 603 of tag similarity and document similarity. The highest scoring users are returned 604 to as a recommendation. Optionally, summarize 605 over a set of tags for a topic.

Document Recommendation

The document recommendation application seeks to analyze the set of bookmarks given by a user to propose new documents which may be of interest to him. The idea is to recommend documents which are (document-space) similar to previous documents bookmarked by similar tags, or because they were bookmarked by (document-space) similar users. In terms of the bookmark triplet, given u and t, the aim is to weight all documents d such that the documents with the highest weight are those most likely to be of interest to this user (with respect to tag t). Therefore, the weight given to each document (represented as a vector of weights) is computed as:

$$\vec{w}_D(t,u) = \alpha_D \vec{S}_{T/D}(t) M_{TD} + (1-\alpha_D) \vec{S}_{U/D}(u) M_{UD} \quad (3)$$

The left part of the equation scores a document according to the (document-space) similarity of the tags it is related to with respect to the given tag t. The right part of the equation scores a document by the (document-space) similarity of the users who bookmarked it to the given user u. The parameter $\alpha_D$ represents the relative weight that is given to tag similarity over user similarity.

Note that documents are recommended to a user in relation to a specific tag. The given tag can represent a specific concept for which document recommendation is required. Alternatively, it can be summarized over all users' tags to aggregate document scores for general context-free recommendation. Although, similarly to tag recommendation, it should be noted that only documents within the system can be recommended.

Figure 7:
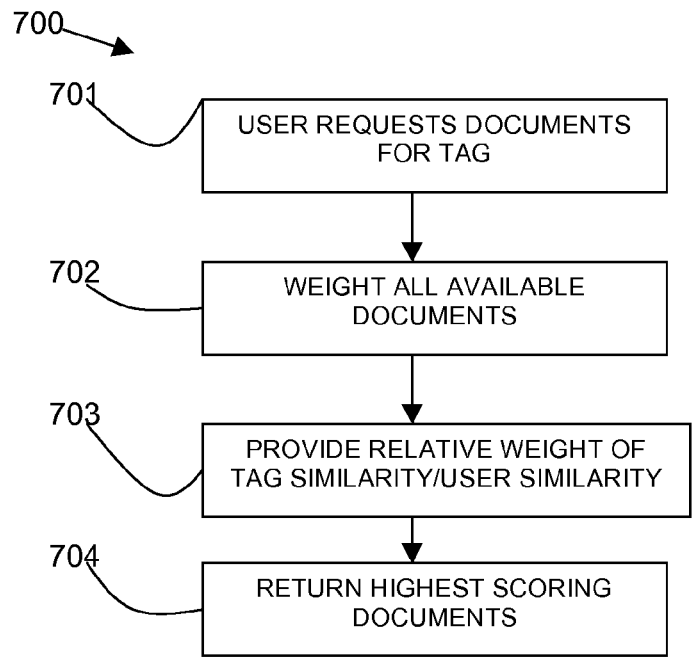
FIG. 7 is a flow diagram of a method of document recommendation in accordance with an aspect of the present invention.

Referring to FIG. 7, a flow diagram 700 shows a method of document recommendation. A user u requests 701 documents of interest to him relating to a tag t. All the documents in the available data are weighted 702 by observing documents similar to previous documents bookmarked by the user and documents bookmarked by users similar to user u. A relative weight is provided 703 of tag similarity and user similarity. The highest scoring documents are returned 704 to the user u as a recommendation.

Search Enhancement

One application makes use of individual bookmarks to improve the quality of search over social bookmarking systems. It is known that adding the text of bookmarks (i.e., the tags) to the content of a document enhances the search quality. However, not all bookmarks are equal in their value because, for example, some may have been given for private usage.

The premise of this application is that boosting of community tags, compared to private ones, will improve the search effectiveness. Thus, every bookmark triplet is weighted in relation to its perceived usefulness for retrieval. Bookmark b is weighted by a linear combination of three weights:
  how well the tag t is predicted to be given by user u for document d:
  how well user u is predicted to tag d with t: and
  how well d is predicted to be bookmarked by u with t.
The weight given to each bookmark, b=(d,u,t), is computed as:

$$w(d,u,t) = \gamma_t \vec{w}_T(u,d)[t] + \gamma_u \vec{w}_U(t,d)[u] + \gamma_d \vec{w}_D(t,u)[d]$$

where $\gamma_t + \beta_u + \gamma_d = 1$

It should be recalled that $\vec{w}_T(u,d)[t]$ is the weight for tag t for the (u, d) pair. Similarly, $\vec{w}_U(t,d)[u]$ is the weight for user u for the (t, d) pair, and $\vec{w}_D(t,u)[d]$ is the weight for d for the (t,u) pair.

The static score for each bookmark is assigned to the bookmark's tag to be used later for document retrieval.

Figure 8:
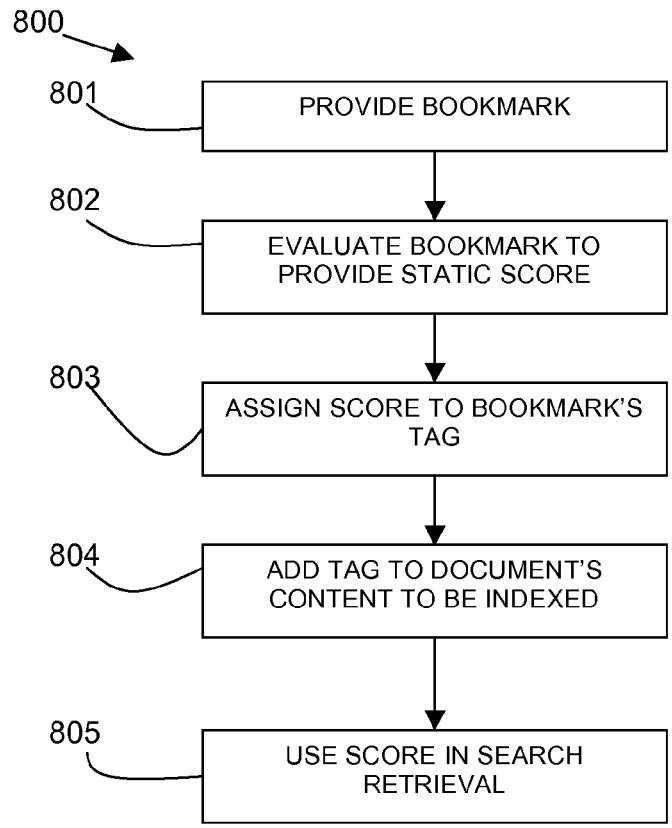
FIG. 8 is a flow diagram of a method of search enhancement in accordance with an aspect of the present invention.

Referring to FIG. 8, a flow diagram 800 shows the method of enhancing search with bookmark evaluation. A bookmark is provided 801 and evaluated 802 to provide a static score as a linear combination of the weight of tag t for the (u,d) pair, the weight of user u for the (t,d) pair and the weight of document d for the (t,u) pair. Optionally, providing a relative weight for the entities. Assign 803 the score to the bookmark's tag. Add 804 the bookmark's tag to the document's content to be indexed. Use the score in search retrieval 805.

A search enhancement system based on relevance of bookmarks may be provided as a service to a customer over a network. A recommendation service for recommending a user, tag or document may be provided as a service to a customer over a network.

The invention can take the form of an entirely hardware embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for using social bookmarks, the method comprising:
  collecting multiple social bookmarks, wherein each social bookmark is a triplet of entities, the triplet having three entity types comprising user, document, and tag;
  representing the collected social bookmarks as a three-dimensional space or matrix of a number of times a user u, used tag t to bookmark document d;
  measuring respective similarities of two entities having a common entity type in the collected social bookmarks;
  using the similarities to weight the entities by using two-dimensions of the three-dimensional space to predict a third dimension thereof, wherein predicting the third dimension comprises defining two-dimensional matrices for each pair of (u,t), (d,t) and (d,u);
  computing values of the entities in one of the two-dimensional matrices as respective vectors of weights of the other two-dimensional matrices;
  ranking the computed values; and
  recommending of at least a portion of the entities in the one of the two-dimensional matrices according to the ranking, wherein any of said steps are implemented in either of computer hardware or computer software embodied in a non-transitory computer-readable medium.

2. The method as claimed in claim 1, including providing a measure of usefulness of a bookmark for describing a document for retrieval purposes.

3. The method as claimed in claim 2, wherein computing values comprises:
  weighting the collected social bookmarks as respective linear combinations of:
  a first weight for tag t for the (u,d) pair;
  a second weight for user u for the (t,d) pair; and
  a third weight for document d for the (t,u) pair.

4. The method as claimed in claim 2, further comprising the steps of:
adding a content of a tag to a content of an associated document therewith;
indexing the content of the tag and the content of the associated document for searching thereof; and
providing the content of the tag and the content of the associated document in one of the social bookmarks, and scoring the content of the tag by the measure of usefulness.

5. The method as claimed in claim 2, including using two-dimensions of the three-dimensional space to predict the third dimension of the three-dimensional space by:
repeating the steps of computing values, ranking, and recommending using another of the two-dimensional matrices; and
repeating the steps of computing values, ranking, and recommending using yet another of the two-dimensional matrices, wherein in the performances of recommending a first recommendation comprises tags to associate with a specific document based on similar documents and similar users, a second recommendation comprises documents based on similar tags and similar users, and a third recommendation comprises users based on similar tags and similar documents.

6. The method as claimed in claim 5 claim 1, wherein computing values further comprises
normalizing the two-dimensional matrices to weight the entities in inverse relation to their respective frequencies.

7. The method as claimed in claim 6, including recommending tags to a given user for a given document, by weighting a tag as a combination of:
scoring each tag by similarity of users providing the tag to the given user; and
scoring each tag by similarity of document associated with the tag to the given document.

8. The method as claimed in claim 6, including recommending users as most likely to provide a given document with a given tag, by weighting a user as a combination of:
scoring each user by similarity of tags the user has provided to the given tag; and
scoring each user by similarity of documents he has tagged to the given document.

9. The method as claimed in claim 8, wherein recommending users for a (d,t) pair are used to validate a bookmark as being useful when u, the recommended user, is highly scored for the (d,t) pair.

10. The method as claimed in claim 8, wherein recommending users is used for a user search to retrieve a community of users who have a common interest in a given tag or set of tags.

11. The method as claimed in claim 6, including recommending documents to a given user, by weighting a document as a combination of:
scoring each document by similarity of other users who tagged that document to the given user; and
scoring each document by similarity to tags related to that document to the given tag;
wherein documents are recommended to a user in relation to a given tag.

12. The method as claimed in claim 11, wherein the weighting of a document is aggregated over all the given user's tags for a context-free recommendation.

13. A computer program product
including a non-transitory computer-readable storage medium in which computer program instructions are stored, which instructions, when executed by a computer, cause the computer to:
collect multiple social bookmarks, wherein each social bookmark is a triplet of entities, the triplet having three entity types comprising user, document, and tag;
represent the collected social bookmarks as a three-dimensional space or matrix of a number of times a user u, used tag t to bookmark document d;
measure respective similarities of two entities having a common entity type in the collected social bookmarks;
use the similarities to weight the entities by using two-dimensions of the three-dimensional space to predict a third dimension thereof, wherein predicting the third dimension comprises defining two-dimensional matrices for each pair of (u,t), (d,t) and (d,u);
computing values of the entities in one of the two-dimensional matrices as respective vectors of weights of the other two-dimensional matrices;
ranking the computed values; and
recommending of at least a portion of the entities in the one of the two-dimensional matrices according to the ranking, wherein said program instructions are stored on said computer readable medium.

14. A system for using social bookmarks comprising:
a collector for collecting multiple social bookmarks from one or more bookmarking servers, wherein each social bookmark is a triplet of entities, the triplet having three entity types comprising user, document, and tag;
a storage medium for storing the collected social bookmarks as a three-dimensional space or matrix of a number of times a user u, used tag t to bookmark document d;
a measuring component for measuring respective similarities of two entities having a common entity type in the collected social bookmarks;
a weighting component for weighting the entities by using two-dimensions of the three-dimensional space to predict a third dimension thereof, wherein predicting the third dimension comprises defining two-dimensional matrices for each pair of (u,t), (d,t) and (d,u);
a scoring component for computing values of the entities in one of the two-dimensional matrices as respective vectors of weights of the other two-dimensional matrices;
ranking the computed values; and
a recommendation component operative for recommending of at least a portion of the entities in the one of the two-dimensional matrices according to the ranking,;
wherein any of said collector, storage medium, measuring component, scoring component and weighting component are implemented in either of computer hardware or computer software embodied in a non-transitory computer readable medium.

15. The system as claimed in claim 14, including a search enhancement component providing a measure of usefulness of a bookmark for describing a document for retrieval purposes.

16. The system as claimed in claim 15, including an indexing component for adding a content of a tag to the document's content to be indexed wherein the tag and document are provided in one of the social bookmarks.

17. The system as claimed in claim 14, wherein the recommendation component uses two-dimensions of the bookmark space to predict the third dimension, and wherein the weighting component is operative for weighting the collected social bookmarks as respective linear combinations of:
a first weight for tag t for the (u,d) pair;
a second weight for user u for the (t,d) pair; and
a third weight for document d for the (t,u) pair.

18. The system as claimed in claim 17, wherein the recommendation component includes:
- a projecting component for projecting the three-dimensional space onto a two-dimensional space by defining the two-dimensional matrices for each of the pairs of (u,t), (d,t) and (d,u) according to weights thereof; and
- a normalizing component for normalizing the two-dimensional matrices to weight entities in inverse relation to their respective frequencies wherein entities of one of the two-dimensional matrices can be represented by a relationship with the entities of two other two-dimensional matrices.

19. The system as claimed in claim 17, wherein the recommendation component includes recommending tags to a given user for a given document, by weighting a tag as a combination of:
- scoring each tag by similarity of users providing the tag to the given user; and
- scoring each tag by similarity of document associated with the tag to the given document.

20. The system as claimed in claim 17, wherein the recommendation component includes recommending users as most likely to provide a given document with a given tag, by weighting a user as a combination of:
- scoring each user by similarity of tags the user has provided to the given tag; and
- scoring each user by similarity of documents he has tagged to the given document.

21. The system as claimed in claim 20, wherein recommending users for a (d,t) pair are used to validate a bookmark as being useful when u, the recommended user, is highly scored for the (d,t) pair.

22. The system as claimed in claim 20, wherein recommending users is used for a user search to retrieve a community of users who have a common interest in a given tag or set of tags.

23. The system as claimed in claim 16, wherein the recommendation component includes recommending documents to a given user, by weighting a document as a combination of:
- scoring each document by similarity of other users who tagged that document to the given user; and
- scoring each document by similarity to other tags related to that document to the given tag;
- wherein documents are recommended to a user in relation to a given tag.

24. The system as claimed in claim 23, wherein the weighting of a document is aggregated over all the given user's tags for a context-free recommendation.

* * * * *